April 11, 1950     S. D. RUSSELL     2,503,416
METHOD OF HARVESTING FORAGE CROPS
Filed March 21, 1945     2 Sheets-Sheet 2
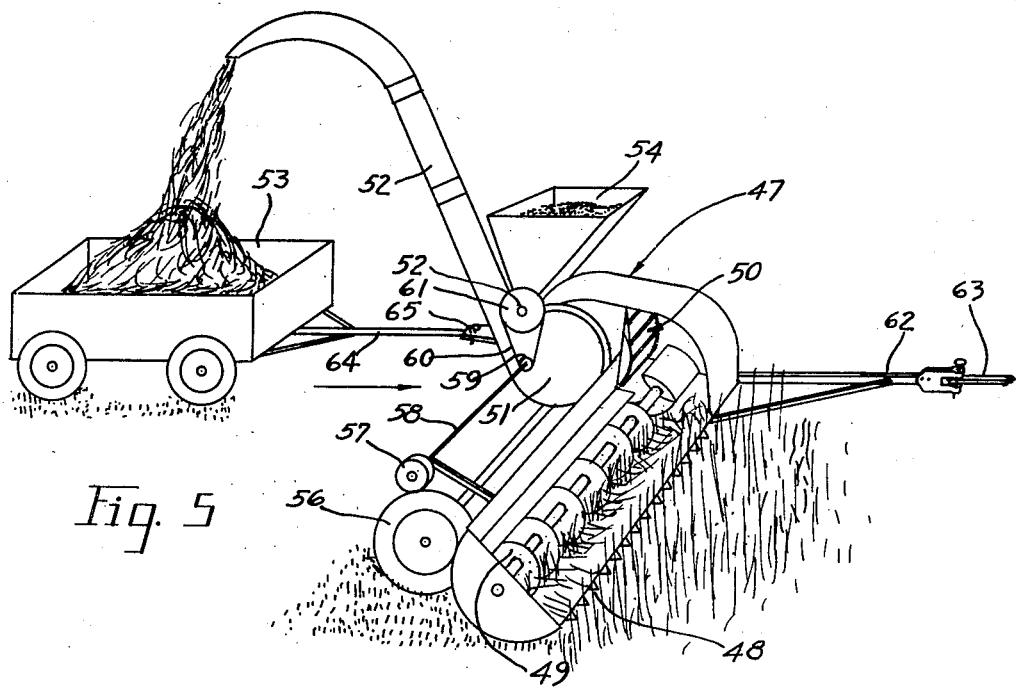
INVENTOR.
Stanley D Russell
BY
Emerson B Donnell
ATTORNEY.

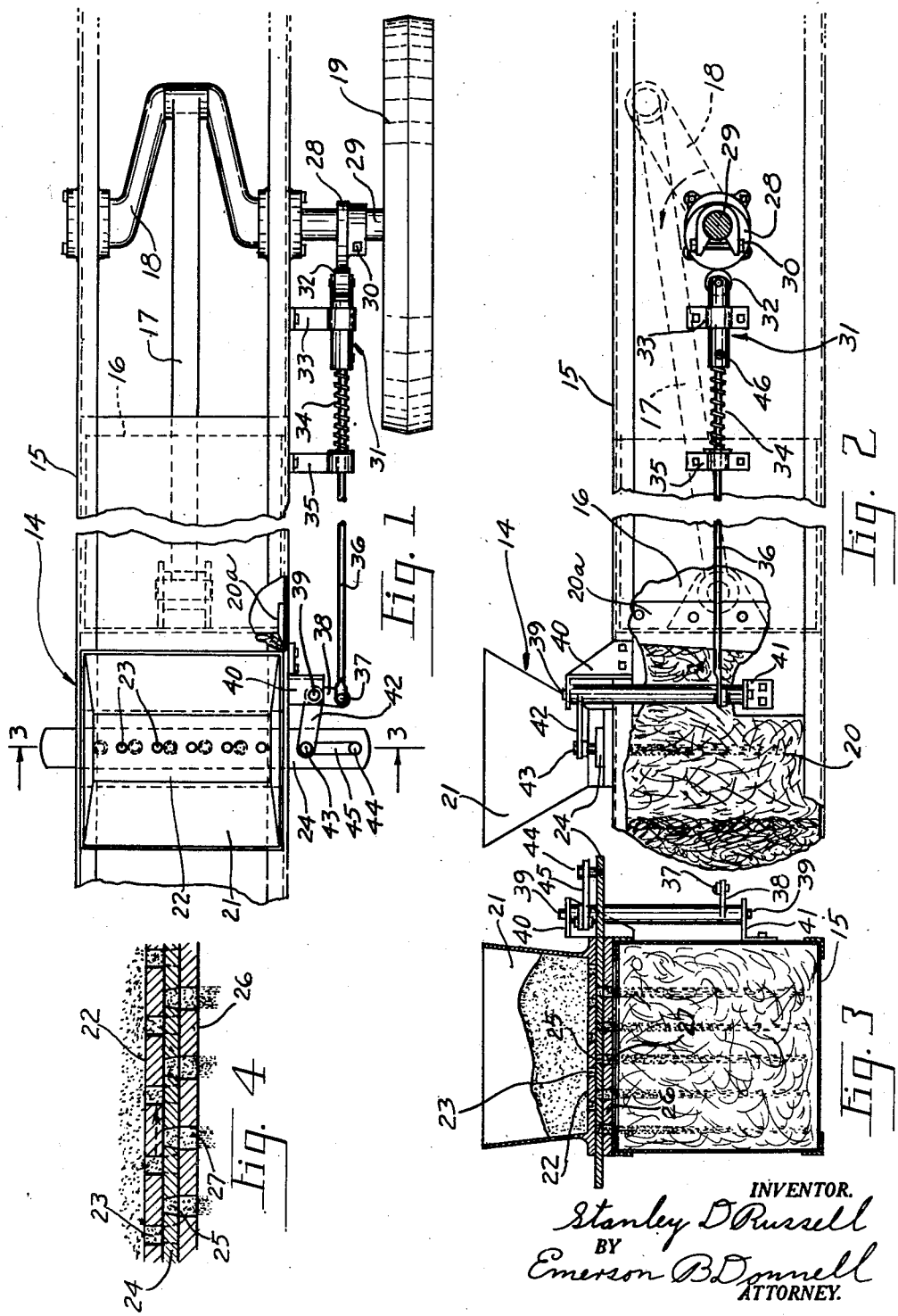

Patented Apr. 11, 1950

2,503,416

UNITED STATES PATENT OFFICE 2,503,416

METHOD OF HARVESTING FORAGE CROPS

Stanley D. Russell, Racine, Wis., assignor to J. I. Case Company, Racine, Wis., a corporation of Wisconsin Application March 21, 1945, Serial No. 583,955

6 Claims. (Cl. 56—1)

The present invention relates to a method and to certain mechanism for harvesting forage crops and an object thereof is to generally improve the practice of such methods and the construction and operation of such mechanism.

Further objects are to provide a method which is more rapid in point of elapsed time and which therefore provides for earlier harvesting and which method provides a crop which is more palatable to livestock, more nutritious and not subject to spoiling. It also provides a method in which a modifying substance is much more thoroughly disbursed than in somewhat analogous methods heretofore known and which method embraces steps extending from the cutting to the storage of such crops.

Further objects are to provide apparatus for adding a modifying substance during a crop treating operation and which embraces mechanism for feeding such substances at a rate in proportion to the rate of treating of the crop.

Further objects are to provide expedients for the realization of the above objects.

The storage of forage crops, such as hay and the like, with the addition of salt or other preservatives or flavoring material, has long been known, the procedure being to build a hay stack by first placing a thin layer of hay on the ground, sprinkling it with the salt or other substance, placing a second layer of hay on the first layer, sprinkling the second layer with salt, placing a third layer, sprinkling with salt, etc., until a stack of the desired size is built, the salt being distributed more or less evenly through the stack. However, the layers have appreciable thickness, and there is no particular uniformity in applying the salt or substance and the whole process involves a large amount of labor and is influenced by the variations and failures common to manual processes. Furthermore, the completed stack is subject to the vagaries of the weather and involves the usual difficulty in feeding the finished crop. The method and means of the present invention results in the incorporation of a modifying substance with substantially perfect uniformity and substantially constant proportion and also in a crop in final form which is particularly convenient to store or feed or ship to distant points.

Further objects and advantages of the invention will become apparent from a consideration of the following detailed description taken in connection with the accompanying drawings wherein a satisfactory example of the invention is shown. However, it is to be understood that the invention is not limited to the details disclosed but includes all such variations and modifications as fall within the spirit of the invention as herein expressed.

In the drawings, Figure 1 is a plan view of so much of a baler as necessary to illustrate one embodiment of the invention.

Fig. 2 is a right side elevation of the same with parts broken away.

Fig. 3 is a vertical sectional view taken on the line 3—3 of Fig. 1.

Fig. 4 is an enlarged detail of a portion of Fig. 3.

Fig. 5 is a perspective view somewhat diagrammatic in character showing the application of the invention to another crop treating operation.

Fig. 6 is a plan view of a hay field with the necessary machines practicing the method which is the subject of the invention.

As seen in Fig. 6, the method according to the invention comprises first mowing the crop by any suitable means as for example the tractor mounted mower generally designated as 10 which travels about the field in the present instance in a clockwise direction as viewed from above. At a given distance or time interval after the passage of mower 10 a rake preferably, although not necessarily, of the side delivery type, generally designated as 11 follows the mower.

In conventional hay harvesting practice, rake 11 will follow mower 10 at quite some distance so as to operate on the cut crop, for example several hours after the passage of mower 10. In the practice of the present method, rake 11 can follow mower 10 after a much shorter period by virtue of the invention which will be explained presently. Rake 11 forms a windrow 12 which is allowed to lie in the field for curing. Under ordinary practice, this curing may take substantially an entire day and possibly several days. In seasons of uncertain weather conditions, showers may wet this windrow so often that it never does have an opportunity to cure properly. Therefore, the resulting fodder may be seriously damaged, bleached or possibly spoiled entirely so that it is unfit for further harvesting. In one embodiment of the invention, the windrow is picked up and baled by a machine generally designated as 13 by a novel method or process which provides for picking up and baling windrow 12 after a much shorter period of curing than has been possible heretofore. Thus, the baling can virtually always be done the same day and commonly substantially immediately after the passage of the mowing machine 10. The moisture content of the windrow may be substantially higher than in ordinary baling but the resulting bales will not heat, mold or otherwise spoil.

The reason for this improved condition rests in the adding in a novel and substantially uniform manner of suitable preserving, improving or modifying substance during the actual treatment of the crop and in such a manner that the proportion of treating substance can be predetermined and will remain substantially constant when once adjusted. Accordingly, one phase of the process comprises the addition of salt to the crop as it is baled, in the present instance a feeder generally designated as 14 being provided for this purpose. By virtue of the feeding of this substance, substantially continuously with the baling process, there will be no appreciable part of the baled crop which is not treated by the substance and conversely no part of the crop will receive an excessive amount of the substance. The salt will prevent bacterial action, as is understood, the necessary amount being determined by trial, and also will make the fodder more palatable to the animals to which it is fed. The palatability will also aid in digestion and assimilation of the crop by the animals.

Some conditions suggest or dictate the addition of lime and it is contemplated as within the invention to add in this manner comminuted chemical, comminuted fodder, and grain, many such substances having been found to be advantageous in the preserving or improving of a forage crop which is to be baled.

As illustrating a typical example of a baler equipped with the feeder 14, Fig. 1 shows a baler having a case of well-known form 15 in which is reciprocable a plunger 16 actuated by a pitman 17 from a crank 18, crank 18 being driven by a flywheel or other suitable or well-known means 19. It is to be understood that the baler will be provided with conventional or suitable driving means, transporting wheels, feeding devices, etc., essential to successful operation, and forming no part of the present invention and therefore not necessary to further describe or illustrate. The baler, however, is provided with a feed opening 20 in the present instance located in one side of chamber 15 and through which the crop is introduced at such times as opening 20 is not covered by plunger 16. It is to be understood that a plunger 16 reciprocates so as to alternately cover and uncover opening 20 in the manner fully set forth in applicant's Patent No. 2,362,861, a knife 20a being fixed on plunger 16 for slicing or dividing the separate feeds.

Feeder 14 is arranged to deposit periodically a small amount of salt, lime or other crop treating material as hereinbefore stated in timed relation to the reciprocations of plunger 16. As will be apparent, much of the time the material will be so tightly compressed in front of plunger 16 that granular material could not penetrate to any extent into the compressed material. However, between these periods, the crop will be comparatively loose, for example when plunger 16 has been retracted and has not yet returned on a compressing stroke, as indicated in Figs. 1 and 2. Material introduced substantially in line with opening 20 at this period, will have an appreciable time interval in which to move partly or substantially entirely through the body of material so as to permeate it thoroughly. The treating material is substantially immediately trapped by the following compressing stroke of plunger 16, the crop tightening about the material and preventing further movement thereof. This action is repeated for each feed or compressing stroke of plunger 16. Therefore, if the salt or treating material should be unable to penetrate the crop in a perfectly uniform manner, at least there will be one "feed" of salt for or within each "feed" of hay. In other words, the salt or treating material is fed in timed relation to the feeds of hay, and is trapped between, or at the junctions of said feeds. For all practical purposes, this would be homogeneous distribution of the salt throughout the hay. This constitutes an important phase of the invention.

For achieving this result, feeder 14 comprises a hopper portion 21 in the present instance located on top of the bale case 15 substantially in line with a portion of opening 20. Hopper 21 is of a size to hold enough salt or other treating material for a reasonably long run of the baler. Hopper 21 has a bottom wall 22 providing a series of openings 23—23, as more particularly indicated in Figs. 3 and 4 and which will remain filled with salt from the supply carried in the hopper. A feeding or measuring plate 24 is shiftable beneath openings 23 and contains a series of openings 25—25 which may register with openings in a plate 26 spaced from bottom wall 22 sufficiently to allow free movement of plate 24. Openings 25—25 are preferably downwardly flared to facilitate discharge of the treating material. Plate 26 is provided with openings 27—27 which may register in one position with above mentioned openings 25. Above mentioned openings 25 in another position register with above mentioned openings 23. Thus, as will be understood, in one position of plate 24, openings 25 will receive salt or treating material from openings 23. Shifting of plate 24 will then transfer this measured amount of material to openings 27 through which the material will be dropped into bale case 15. In the present instance, plate 24 is reciprocable between plates 22 and 26. As will be apparent, it is necessary that the registration of opening 25 with openings 27 must occur in timed relation to the reciprocations of plunger 16 so that the salt will be dropped into the bale case only at such times as the hay is in condition to receive it. It is contemplated that this may be accomplished in any suitable way within the scope of certain phases of the invention, in the illustrated embodiment, plate 24 being shifted from a cam 28 actuated from crank 18.

Cam 28 in the present instance is adjustably fixed on a shank portion 29 by a clamping screw 30 and actuates a follower generally designated as 31 provided with a roller 32. The action of the cam reciprocates follower 31 in a guide 33 carried by bale case 15, a spring 34 bearing against a suitable abutment 35, pressing follower 31 and roller 32 against cam 28. Follower 31 actuates a push rod 36 pivoted at 37 to an arm 38 of a bell crank fulcrumed on a pivot 39. Pivot 39 is carried in brackets 40 and 41 supported on bale case 15 and an arm 42 connects a pivot 43 with a pivot 44 on plate 24 by means of a link 45. In this manner, rotation of cam 28 will cause reciprocation of plate 24 in timed relation to the rotations of crank 18.

Different conditions may require different amounts of salt or other treating material. This may be accomplished by exchanging plate 24 for one with openings the required size for the desired feed rate, pivot 44 being readily removable for this purpose. Alternatively, push rod 36 is adjustably connected with follower 31 as by a set screw 46. Adjusting rod 36 in relation to follower 31 will change the range of movement of plate 24, resulting in only a partial registration of openings 25 with openings 23 and 27. This will limit the amount of material which may be fed into the hay or other crop during the comparatively short interval that the openings are in registration.

Once the correct timing or relation between the reciprocations of plate 24 and the reciprocations of plunger 16 is determined, it should be seldom necessary to change it. However, if such adjustment is necessary, it is a simple matter to loosen clamp screw 30 and shift cam 28 in relation to shank 29 until the correct timing is obtained.

As seen in Fig. 5, the process is applicable to other harvesting procedure than baling. For example, there is conventionally illustrated a forage harvester generally designated as 47, the machine including a cutter bar 48, a feeding or platform auger conveyor 49, a feeder roll 50, and a discharge blower 51, it being understood that the harvested crop is fed by roller 50 into a cutter of conventional type not shown, the material being chopped and discharged through a spout 52 into a trailing wagon or the like 53. In this embodiment, a hopper 54 contains a quantity of treating material such as salt, lime or the like which is fed in a substantially continuous manner by a feeding means generally designated as 55 into spout 52 at a rate proportional to the forward travel of the harvester 47. The material is thereby blended in a substantially homogeneous manner with the crop as it is discharged into wagon 53. In the present instance, harvester 47 is carried on ground wheels, such as 56. Wheels 56 obviously rotate in proportion to the forward travel of the machine and a roller 57 is pressed into contact with wheel 56 and rotated thereby. Roller 57 is connected by a shaft 58 with a pulley or the like 59 which is connected by a belt 60 to a pulley 61 which drives feeding means 55. Harvester 47 is connected as by a tongue 62 with a drawbar 63 of a tractor or other propelling vehicle and wagon 53 has a tongue 64 connected to harvester 47 by means of a hitch generally designated as 65.

In the practice of the invention by the above described apparatus, it is contemplated that other materials than salt, lime, etc., may be added to the material being treated. For example, any of the small grains which it is desired to blend with the baled or chopped, or otherwise treated material, may be placed in the hopper 21 or the hopper 54 and fed in measured quantities into the crop being harvested.

The manner in which the objects of my present invention are accomplished, will be apparent from the foregoing specification. No effort, however, has been made to go into exact detail of construction and assembly, as the ultimate details will necessarily have to be determined by the character of service for which the device is employed.

The operation is thought to be clear from the above description and what is claimed as new and desired to be secured by Letters Patent of the United States is:

1. A method of harvesting forage crops comprising severing the crop from the ground, forming a swath from the cut crop, forming the swath into a windrow, forming the windrow into a series of feeds for compression to form a bale, introducing a modifying ingredient at the junctions of the feeds and forming the feeds into a bale.

2. A method of harvesting forage crops comprising severing the crop from the ground, forming a swath from the cut crop, forming the swath into a series of feeds for compression to form a bale, introducing a modifying ingredient at the junctions of the feeds, and forming the feeds into a bale.

3. A method of harvesting forage crops comprising severing the crop from the ground, forming the crop into a series of feeds for compression to form a bale, introducing a modifying ingredient at the junctions of the feeds, and forming the feeds into a bale.

4. A method of harvesting windrowed crops comprising picking up the windrow, forming the windrow into a series of feeds for compression to form a bale, introducing a modifying ingredient at the junctions of the feeds, and forming the feeds into a bale.

5. A method of harvesting forage crops comprising severing the crop from the ground, forming the crop into a series of feeds for compression to form a bale, introducing a preservative ingredient at the junctions of the feeds, and forming the feeds into a bale.

6. A method of harvesting forage crops comprising severing the crop from the ground, forming the crop into a series of feeds for compression to form a bale, introducing a flavoring ingredient at the junctions of the feeds, and forming the feeds into a bale.

STANLEY D. RUSSELL.

REFERENCES CITED

The following references are of record in the file of this patent:

UNITED STATES PATENTS

| Number | Name | Date |
| --- | --- | --- |
| 506,892 | Wiebe | Oct. 17, 1893 |
| 1,013,568 | Sharpe, Jr. | Jan. 2, 1912 |
| 1,332,495 | Graham | Mar. 2, 1920 |
| 1,454,558 | Paton | May 8, 1923 |
| 1,458,936 | Hart | June 19, 1923 |
| 1,726,535 | Bowers | Sept. 3, 1929 |
| 1,823,387 | Campbell | Sept. 15, 1931 |
| 1,919,897 | MacGregor et al. | July 25, 1933 |
| 1,932,660 | Grant | Oct. 31, 1933 |
| 1,938,264 | Templeton | Dec. 5, 1933 |
| 2,157,619 | McElwain | May 9, 1939 |
| 2,314,439 | Beegle | Mar. 23, 1943 |
| 2,318,229 | Jones | May 4, 1943 |
| 2,346,103 | Everett | Apr. 4, 1944 |
| 2,381,620 | Russell | Aug. 7, 1945 |